United States Patent

Bryson et al.

[11] Patent Number: 5,938,916
[45] Date of Patent: Aug. 17, 1999

[54] ELECTROLYTIC TREATMENT OF AQUEOUS SALT SOLUTIONS

[75] Inventors: Julian Bryson, Calne; James Spickernell, London; Ian Woodcock, Hungerford, all of United Kingdom; Nougzar Djeiranishvili; Sergei Boutine, both of Moscow, Russian Federation; Marina Kirk, Aldershot, United Kingdom; Alexey Juryevich Popov, Moscow, Russian Federation

[73] Assignee: Solenzara International Limited, Tortola, Virgin Islands (Br.)

[21] Appl. No.: 08/869,710

[22] Filed: Jun. 5, 1997

[30] Foreign Application Priority Data

Oct. 23, 1996 [GB] United Kingdom .................. 9622111

[51] Int. Cl.⁶ .................................................. C02F 1/461
[52] U.S. Cl. .................... 205/746; 205/701; 205/747; 204/263; 204/264; 204/266
[58] Field of Search ....................... 205/746, 747, 205/701; 204/263, 264, 266

[56] References Cited

U.S. PATENT DOCUMENTS

| | | | |
|---|---|---|---|
| 4,204,920 | 5/1980 | Kurtz et al. | 204/98 |
| 4,250,126 | 2/1981 | Yates | 205/746 |
| 4,280,883 | 7/1981 | Raetzsch | 204/98 |
| 4,334,968 | 6/1982 | Sweeney | 205/746 |
| 4,370,209 | 1/1983 | Graybill et al. | 204/98 |
| 4,405,418 | 9/1983 | Takemura | 204/95 |
| 4,767,511 | 8/1988 | Aragon | 204/128 |
| 4,790,915 | 12/1988 | Winsel et al. | 204/98 |
| 4,919,791 | 4/1990 | Miles et al. | 204/98 |
| 5,427,667 | 6/1995 | Bakhir et al. | 204/263 |

FOREIGN PATENT DOCUMENTS

| | | |
|---|---|---|
| 52-105598 | 9/1977 | Japan . |
| 1 480 538 | 7/1977 | United Kingdom . |
| 2 063 917 | 6/1981 | United Kingdom . |
| 1 599 191 | 9/1981 | United Kingdom . |
| 2 253 860 | 9/1992 | United Kingdom . |
| 2253860 | 9/1992 | United Kingdom . |

*Primary Examiner*—Arun S. Phasge
*Attorney, Agent, or Firm*—Kubovcik & Kubovcik

[57] ABSTRACT

There is disclosed a method and apparatus for generating a sterilizing solution through the electrolytic treatment of an aqueous salt solution. An aqueous salt solution is passed, under pressure, into the working chamber of an electrolytic cell, which cell is divided into a working chamber and an auxiliary chamber by a permeable membrane. The solution is filtered through the membrane, and collected from an output of the auxiliary chamber. Gases, such as chlorine, liberated in the working chamber during electrolysis, are dissolved in a water supply, and this water supply is partially or fully mixed with the output of the auxiliary chamber so as to generate a sterilizing solution. The method and apparatus disclosed serves to generate a sterilizing solution with less expenditure of energy and raw materials than in the prior art.

17 Claims, 2 Drawing Sheets

ELECTROLYTIC TREATMENT OF AQUEOUS SALT SOLUTIONS

The present invention relates to a method and apparatus for the electrolytic treatment of aqueous salt solutions so as to generate solutions with oxidizing and/or reducing characteristics, and in particular, but not exclusively, to generate a sterilising solution.

It is known from GB 2253860, the disclosure of which is incorporated into the present application by reference, to treat water by passing this through an electrolytic cell having anode and cathode flow chambers separated by a porous membrane, one of the chambers being a working chamber through which water to be treated passes in an upward direction, and the other being an auxiliary chamber, which is in closed communication with a gas-separating chamber located at a higher level than the electrolytic cell. Water having a higher mineral content than the water to be treated passes upwardly through the auxiliary chamber to the gas-separating chamber and recirculates to the auxiliary chamber by convection and by then shearing forces applied to the water through the rise of bubbles of gas which are generated on the electrode in the auxiliary chamber. The water pressure in the working chamber is higher than that in the auxiliary chamber, and gaseous electrolysis products are vented from the gas-separating chamber by way of a gas-relief valve.

This method allows the pH value of the water being treated to be reduced from 7 to around 2 when the anode chamber is used as the working chamber. If instead the cathode chamber is used as the working chamber, the pH value of the water to be treated can be increased to around 12. This known method of electrolytic treatment is applied only to water having a relatively low concentration of dissolved salts and minerals (less than $10 gdm^{-3}$), and the electricity supplied for the electrolytic treatment of water in the working chamber is only around 200 to $3000 Cdm^{-3}$. Because the water to be treated has such a low concentration of dissolved salts and minerals, there is consequently a low concentration of useful electrolysis products (such as the chlorate (I) ion $ClO^-$ which is produced when a sodium chloride solution is used in the auxiliary chamber and which acts as a disinfecting agent). In addition, water with a low concentration of salts and minerals tends to have a high ohmic resistance, which means that energy is used inefficiently when performing electrolysis. Furthermore, the small amount of electricity (200 to $3000 Cdm^{-3}$) applied to the water in the working chamber is insufficient to ensure the full transformation of the ions of dissolved salts (such as chloride ions $Cl^-$) into useful electrolysis products (such as chlorate (I) ions $ClO^-$) The incomplete electrolysis of dissolved salts means that a greater than theoretically necessary amount so salt must initially be dissolved in order to provide a required concentration of electrolysis products. This excess of dissolved salt can mean that the output of the electrolytic cell is overly corrosive, and when used as a disinfectant wash, tends to leave a coating of crystalline salt on surfaces which have been washed.

It is useful to consider the basic chemical reactions which take place in the anode and cathode chambers of the electrolytic cell. If the working chamber contains the anode, then the following reactions take place:

Chloride ions transform into gaseous chlorine in accordance with the following equation:

$$2Cl^- \rightarrow Cl_2 + 2e^-$$

Gaseous chlorine dissolves in water and forms hypochlorous acid in accordance with the following equation:

$$Cl_2 + H_2O \rightarrow H^+ + Cl^- + HClO$$

Electrolysis of water also takes place in the anode chamber. The equation is as follows:

$$2H_2O \rightarrow 4H^+ + O_2 + 4e^-$$

As a result of this reaction, gaseous oxygen is liberated and the water becomes saturated with hydrogen ions. Consequently, the pH of the water falls in the anode chamber. The solubility of chlorine in the water reduces as the pH is lowered, and gaseous chlorine is liberated with oxygen.

Electrolysis of water takes place in the cathode chamber. The equation is as follows:

$$2H_2O + 2e^- \rightarrow 2OH^- + H_2$$

Consequently gaseous hydrogen is liberated at the cathode, and the concentration of hydroxide ions rises, thereby increasing the water pH in the cathode chamber.

It follows from this analysis that the oxidizing ability of water is determined by the concentration of hypochlorous acid, and the reduction ability by the concentration of hydroxide ions. Water which has been under electrolytic treatment according to the method described in GB 2253860 has a low concentration of hypochlorous acid and hydroxide ions due to the low mineralisation of the initial water One way of estimating the effectiveness of a sterilising solution produced by the electrolytic Treatment of a salt solution is to measure the concentration of "free chlorine", by which is understood the concentration of hypochlorous acid in water and the concentration of the chlorate ion (formed by the dissociation of hypochlorous acid).

The concentration of free chlorine in water which has been treated in the anode chamber of the electrolytic cell of GB 2253860 does not usually exceed 0.2 to $0.6 gdm^{-3}$, although the solubility of gaseous chlorine in water is much higher ($7.3 gdm^{-3}$ at 20° C.) It is therefore apparent that water which has been under electrolytic treatment in accordance with the known method has a concentration of free chlorine not more than 3 to 10% of the possible maximum.

According to a first aspect of the presets invention, there is provided a method of treating an aqueous salt solution in an electrolytic cell, the cell comprising a working chamber and an auxiliary chamber separated from each other by a permeable membrane, one chamber including an anode and the other a cathode, wherein;

i) an aqueous salt solution is supplied to the working chamber at higher than atmospheric pressure;

ii) the solution is filtered under pressure through the permeable membrane into the auxiliary chamber;

iii) an electric current is applied between the cathode and the anode through the aqueous salt solution and the permeable membrane so as to cause electrolysis of the aqueous salt solution; and iv) the solution is substantially all output from the auxiliary chamber.

According to a second aspect of the present invention, there is provided an apparatus for the electrolytic treatment of an aqueous salt solution, the apparatus comprising an electrolytic cell having a working chamber and an auxiliary chamber separated from each other by a permeable membrane, one chamber including an anode and the other a cathode, wherein, in use:

i) an aqueous salt solution is supplied to the working chamber at higher than atmospheric pressure;

ii) the solution is filtered under pressure through the permeable membrane into the auxiliary chamber;

iii) an electric current is applied between the cathode and the anode through the aqueous salt solution and the permeable membrane so as to cause electrolysis of the aqueous salt solution; and iv) the solution is substantially all output from the auxiliary chamber.

In a preferred embodiment, the working chamber includes the anode and the auxiliary chamber the cathode. The Following description relates to this preferred embodiment, although it will be appreciated by a person of ordinary skill that the anode and cathode may be reversed for certain applications.

Salts suitable for making up the aqueous salt solution include sodium chloride, potassium chloride, lithium chloride and any combination thereof.

The electrolytic cell is advantageously configured so that the aqueous salt solution passes n an upward direction. The working and auxiliary chambers may be defined by a concentric anode/cathode pair separated by the permeable membrane. The aqueous salt solution may be input from the bottom part of the working chamber, and output from the top part of the auxiliary chamber.

In contrast to the system disclosed in GB 2253860, the present invention may work on an aqueous salt solution with a relatively high concentration of dissolved salts (typically from 5 up to 35% by weigh,), or even a saturated salt solution. This is passed under pressure into the working chamber, and is forced through the permeable membrane into the auxiliary chamber down the pressure gradient between the two chambers. The flow rate of aqueous salt solution into the working chamber is set in such a way that the electricity requirement in the cell typically ranges from 30,000 up to 1,000,000Cdm$^{-3}$. Gases which are liberated in the working chamber as a result of electrolysis may be removed from the upper part of the working chamber and may be dissolved in a separate supply of water so as to impart oxidizing characteristics to this water. The liquid output from the auxiliary chamber, which has reducing characteristics, may be partially or fully mixed with the water with oxidizing characteristcs.

Embodiments of the present invention can generate aqueous solutions with oxidizing or reducing characteristics and with a relatively high concentration of, for example, free chlorine or alkali, with considerably lower consumption of electricity and salt feedstock than in the known system. This may be achieved by passing a relatively concentrated, and in some embodiments saturated, aqueous salt solution into is the working chamber at a relatively low rate. The salt concentration is typically from 50 to 350gdm$^{-3}$, which is 20 to 100 times higher than in the known system of GB 2253860, and the flow rate is typically 50 to 200 times lower. Because of the relatively high concentration of the salt solution, its ohmic resistance is relatively low, which means that less electricity is required to perform the required electrolysis. The input into the working chamber is at a pressure greater than atmospheric pressure, which gives rise to a pressure drop across the membrane which means that substantially all the solution passed into the working chamber is filtered through the permeable membrane into the auxiliary chamber. The magnitude of the pressure drop is typically in the range 0.2 to 1.5 bar. This flow across the membrane helps to prevent hydroxide ions from passing into the working chamber from the auxiliary chamber, and therefore allows a relatively low pH value (in some cases 1 or near to 1) to be maintained in the working chamber. Because the solubility of gaseous chlorine is sharply reduced in a solution of low pH, this condition is very favourable for the liberation of gaseous chlorine in the working chamber.

The relatively low flow rate at which the aqueous salt solution is input to the working chamber means that the solution is heated to a relatively high temperature (undergoing a temperature rise of at least 10° C., and more preferably, at least 20° C.) by the electric current passing between the anode and the cathode. A relatively high temperature, for example 40° C., is also favourable for the liberation of gaseous chlorine, since the solubility of gaseous chlorine in water at 40° C. is less than half that at 10° C.

Gases liberated in the working chamber, which will generally be a mixture of chlorine arid oxygen, but may also include ozone and chlorine dioxide among others, may be taken from the upper part of the working chamber, be passed through a conduit and a pressure reducer, which serves to maintain the pressure drop across the permeable membrane, and be dissolved in water so as to impart oxidizing characteristics to this water. These gases can be dissolved in the water by way of, for example, a venturi pump, or they may simply be bubbled through a volume of water, and this may be done batchwise or continuously. This method allows gaseous chlorine to be dissolved in water so as to achieve considerably higher concentrations of free chlorine than in the method noted in GB 2253860.

As discussed above, aqueous salt solution, which may be saturated, is supplied from the working chamber into the auxiliary chamber through a permeable membrane. In the working chamber, there is a relatively high concentration of $Na^+$ and $H^+$ ions, while in the auxiliary chamber, there is a relatively high concentration of hydroxide ions Because of the low flow rate through the auxiliary chamber, the solution which is output from the auxiliary chamber has a high pH (typically from 11 up to 13), and is strongly alkaline.

When gaseous chlorine is dissolved in water, the pH of the water is lowered:

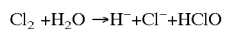

$$Cl_2 + H_2O \rightarrow H^+ + Cl^- + HClO$$

The lowering of the pH reduces the solubility of gaseous chlorine. To increase the concentration of free chlorine, some or all of the alkaline output of the auxiliary chamber of electrolyser is added to the water in which then gaseous chlorine is being dissolved so as to counteract the lowering of the pH and thereby to increase the solubility of gaseous chlorine. In this way, it is possible to achieve concentrations of free chlorine of 4gdm$^{-3}$ and higher, which is considerably greater (typically ten times greater) than the concentrations achieved by the method of GB 2253860

Although the concentration of the initial aqueous salt solution used in the present invention is considerably higher than that used in GB 22253860, the low flow rate through the electrolytic cell means that overall salt consumption can typically be ten times lower. Furthermore, since the flow rate through the auxiliary chamber is low, the rate of deposition of hard salts, such as carbonates, on the cathode is also low.

Should aqueous solution be carried cut of the working chamber with the gases liberated by electrolysis, then the gas and liquid phases may be separated in a gas/liquid separator, and the liquid phase returned to the working chamber.

Similarly, the solution which is output from the auxiliary chamber may be separated in a gas/liquid separator from the gaseous hydrogen which is evolved during electrolysis and returned to the auxiliary chamber. The gaseous hydrogen may be released to atmosphere or passed to storage.

Should overheating of the electrolytic cell be observed, cooling water may be supplied to the auxiliary chamber. Furthermore, in order to remove any build-up of hard salts on the electrode in the auxiliary chamber, a detergent acid solution may be supplied to the auxiliary chamber in order to clear these deposits.

BRIEF DESCRIPTION OF THE DRAWINGS

For a better understanding of the present invention, and to show how it may be carried into effect, reference shall now be made to the accompanying drawings, in which.

As shown in FIG. 1, an aqueous salt solution with a relatively high salt (e.g. NaCl) concentration is passed under pressure greater than atmospheric into a working (anode) chamber 2 of an electrolytic cell 1, the working chamber being bounded by a permeable membrane 6 and an anode 4. The solution is passed, under pressure, through the permeable membrane 6 from the working chamber 2 into an auxiliary (cathode) chamber 3, which is bounded by a cathode 5 and the permeable membrane 6. An electric current is passed between the anode 4 and the cathode 5 by way of the aqueous salt solution in the working and auxiliary chambers 2, 3 and the porous membrane 6. The current causes a series of electrolytic reactions to take place, as described hereinabove, so as to generate various electrolysis products including gaseous chlorine and hydrogen, hypochlorous acid and various ions in solution. The greater the amount of electricity expended per unit volume of aqueous solution, the greater the efficiency of the electrolytic process. The concentration of salt in the aqueous salt solution, the flow rate into the working chamber 2 and the current flow between the anode 4 and the cathode 5 all influence the electrolytic transformation of the aqueous salt solution into the products of interest, such as gaseous chlorine and hypochlorous acid.

Figure 1:
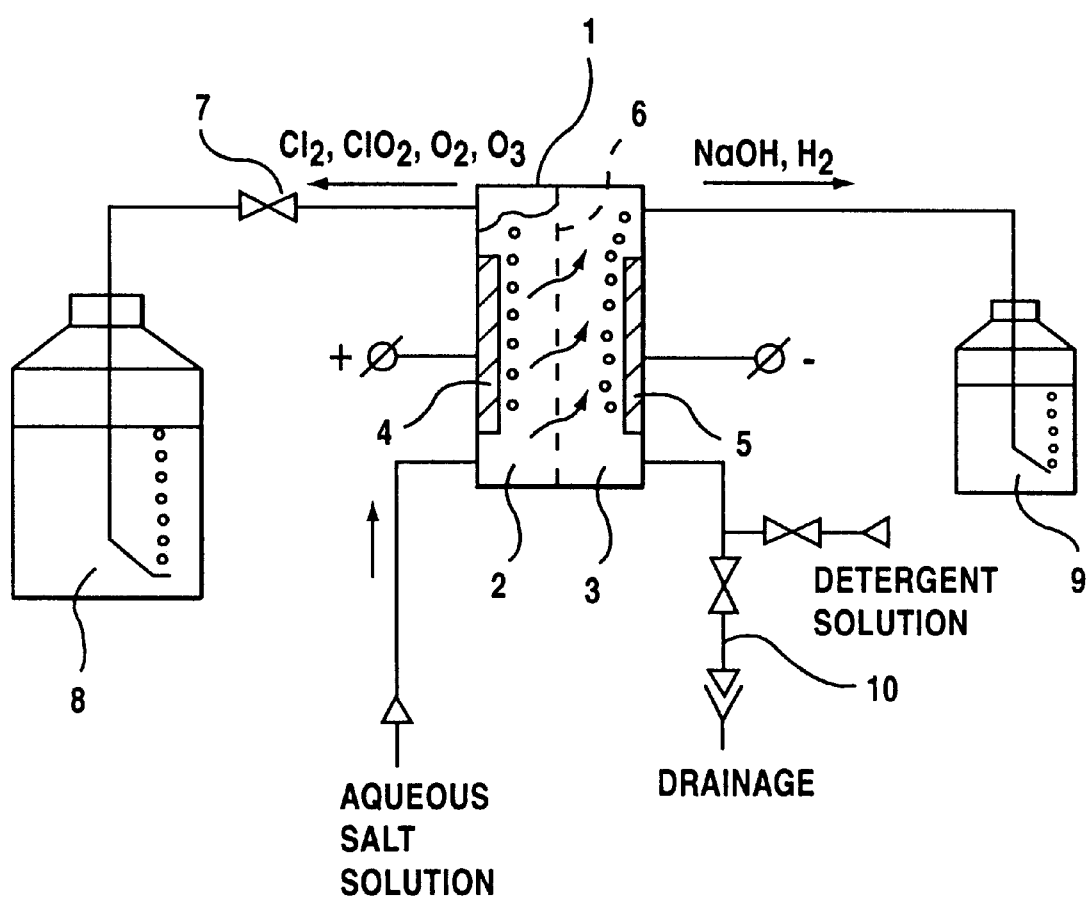
FIG. 1 shows in schematic detail a first embodiment of the present invention.

In the exemplary embodiment of the present invention, the flow rate of solution into the working chamber 2 in selected so that the specific expenditure of electricity is in the range between 30,000 to 1,000,000Cdm$^{-3}$. At this level of expenditure, chloride ions in the aqueous salt solution are almost fully transformed into gaseous chlorine.

In the method of GB 2253860, a pH of 2 to 6 can be attained in the working (anode) chamber during electrolysis, but the solubility of gaseous chlorine in water at such pH levels is still relatively high. In the exemplary embodiment of the present invention, on the other hand, a pH level near to 1 can be attained in the working chamber 2. At this level, the solubility of gaseous chlorine is considerably lower, which helps to promote the liberation of gaseous chlorine from the solution in the working chamber 2. This low pH level is achieved by passing the aqueous salt solution into the working chamber 2 under pressure greater than atmospheric, while maintaining atmospheric pressure in the auxiliary chamber 3. The resulting pressure drop across the permeable membrane 6 forces the solution to filter through the permeable membrane into the auxiliary chamber 3, thereby hindering the migration of hydroxide ions from the auxiliary chamber 3 into the working chamber 2. Because the hydroxide ions are kept within the auxiliary chamber 3, they are not able to neutralise the H$^-$ ions in the working chamber 2, and a low pH can therefore be maintained. In most cases, a pressure drop of 0.2 to 1.5 bar across the permeable membrane 6 is enough to prevent the migration of hydroxide ions into the working chamber 2.

Because of the high specific expenditure of electricity in the exemplary embodiment of the present invention, the temperature of the solution in the working chamber 2 increases typically by 10 to 50° C. As the temperature of the solution rises, the solubility of gaseous chlorine is reduced, and the rate of liberation is consequently increased.

The solution which passes through the permeable membrane 6 from the working chamber 2 to the auxiliary chamber 3 has a high concentration of H$^-$ and Na$^{31}$ ions. In the auxiliary chamber 3, electrolysis of water generates a surplus of hydroxide ions at the cathode:

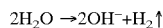

The hydroxide ions react with the H$^\uparrow$ ions to form water:

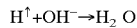

Consequently, the solution in the auxiliary chamber has a high concentration of hydroxide ions and Na+ ions, and has a pH level typically in the range 11 to 13. This solution is output from the electrolytic cell 1 from the upper part of auxiliary chamber 3 and is passed to a tank 9.

The gaseous products of electrolysis in the working chamber, which are mainly chlorine and oxygen, but also include ozone and chlorine dioxide among others, are taken off from the upper part, of the working chamber 2 and passed, via a pressure reducer 7 which helps to maintain the pressure in the working chamber 2, to a tank a in which they are dissolved in water in order to prevent the pH of the water falling to a level where the solubility of gaseous chlorine is significantly reduced, a predetermined amount of the alkaline solution held in tank 9 may be added. Since the solubility o gaseous chlorine in water is 7.3gdm$^{-3}$ at 20° C., it is possible to generate a sterilising solution with oxidizing characteristics and a concentration of free chlorine ten times greater than that achievable by the method of GB 32253860.

The auxiliary chamber 3 may be drained by way of a conduit 10, and a detergent/acid solution may be passed into the auxiliary chamber 3 in order to remove hard salt deposits or the cathode.

Figure 2:
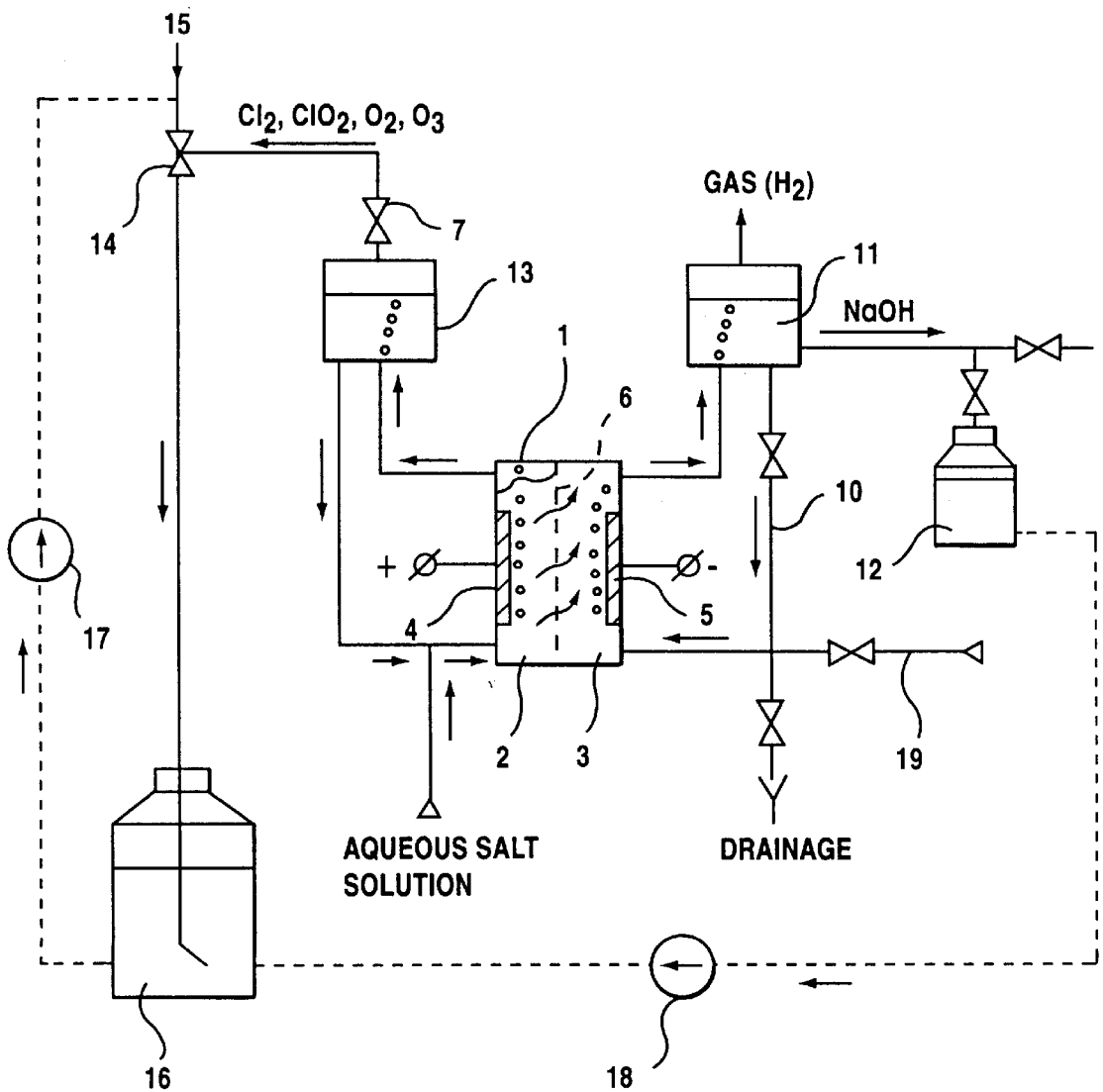
FIG. 2 shows in schematic detail a second embodiment of the present invention.

An alternative embodiment of the invention is shown in FIG. 2. The same reference numerals as those used for the FIG. 1 embodiment are used for similar parts in the FIG. 2 embodiment.

An aqueous salt solution is passed under pressure greater than atmospheric into the working (anode) chamber 2 of an electrolytic cell 1, and undergoes electrolysis as described with reference to the FIG. 1 embodiment. The alkaline solution output from the upper part of the auxiliary chamber 3 is passed to a gas/liquid separator 11, where gases liberated in the auxiliary chamber 3, such as hydrogen, are vented to atmosphere or storage. The liquid part of the output from the auxiliary chamber 3 is then passed from the gas/liquid separator 11 to a tank 12, or may be recirculated to the auxiliary chamber 3.

The output of the working chamber 2, which comprises the gaseous products of electrolysis in the working chamber 2 (mainly chlorine and oxygen, but also including some ozone and chlorine dioxide among others) and some liquid in the form of vapour, is taken off from the upper part of the working chamber 2 and passed to a gas-liquid separator 13. The liquid phase is recirculated to the working chamber 2, and the gas phase is passed, by way of a pressure reducer 7, which helps to maintain the pressure in the working chamber 2, to a venturi 14 by which at least some of the gas phase is dissolved in a water supply 15. The output of the venturi 14 is then massed to a tank 16. The solution in the tank 16 may be recirculated via the venturi 14 by way of a recirculation pump 17.

In order to prevent the pH of the solution falling to a level where the solubility of gaseous chlorine is significantly reduced, a predetermined amount of the alkaline solution held in tank 12 may be added by way of pump 18. The pH of the solution in the tank 16 is ideally maintained in the range 5.0 to 9.0, with a range 7.0 to 9.0 being preferred should it be necessary to keep the corrosive activity of the free chlorine solution to a low level. Since the solubility or gaseous chlorine in water is is 7.3gdm$^{-3}$ at 20° C., it is possible to generate a sterilising solution with oxidizing characteristics and a concentration of free chlorine ten times greater than that achievable by the method of GB 2253860.

The auxiliary chamber 3, may be drained by way of a conduit 10, and a detergent/acid solution may be passed into the auxiliary chamber 3 by way of conduit 19 in order to remove hard salt deposits on the cathode. An addition, water may be introduced into the auxiliary chamber 3 by way of conduit 19 in order to dilute the alkaline solution output by the auxiliary chamber 3, and also to cool the electrolytic cell 1 in the event of overheating.

A specific example of the use of an embodiment of the present invention shall now be given, the results being compared with those achieved by the system disclosed in GB 2253860.

An electrolytic cell 1 was formed with an outer, cylindrical anode, made of titanium and coated on its inside surface with ruthenium oxide, and an inner, rod cathode, made of titanium, the anode and cathode being disposed concentrically. Between the anode and the cathode was placed a permeable ceramic cylinder made of zirconium oxide, with thickness 1mm and an effective filtration Surface of 70cm$^2$. The results of electrolytic treatment of an aqueous salt solution are presented in Table 1:

TABLE 1

|  | Present Invention | Prior art (GB2253860) |
| --- | --- | --- |
| Concentration of initial aqueous salt (NaCl) solution /gdm$^{-3}$ | 300 | 3 |
| Water flow rate through the working chamber/(dm$^3$/hour) | 0.1 | 18 |
| Potential difference applied across the cell/V | 4.0 | 18.0 |
| Current supplied across the cell/A | 15.0 | 15.0 |
| Specific expenditure of electricity in the working chamber/Cdm$^{-3}$ | 500,00 | 3,000 |
| Concentration of free chlorine in the solution to which oxidising characteristics have been imparted/gdm$^{-3}$ | 1.5 | 0.4 |
| Flow rate of water with oxidizing characteristics/(dm$^3$/hour) | 18 | 18 |
| Free chlorine productivity/(g/hour) | 27 | 7.2 |
| Efficiency of conversion of sodium chloride to free chlorine/(g [ClO$^-$]/g [NaCl]) | 0.90 | 0.12 |
| Power consumption of the electrolytic cell/(W/hour) | 0.06 | 0.27 |
| Specific power consumption (required to generate 1 kg of free chlorine/(W/kg) | 3.3 | 37.5 |

It can be seen that this embodiment of the present invention has the following advantages over the prior art:

i) 180 times less water is passed through the working chamber, which greatly reduces carbonate deposition on the cathode.

ii) The amount of free chlorine produced and the effective concentration in the sterilising solution is 3.75 times higher.

iii) The efficiency of conversion sodium chloride sodium into free chlorine is 7.5 times higher.

iv) The electric cower used in the electrolytic cell is 4.5 times lower.

v) Time electric power required to generate 1kg of free chlorine is 11.4 times lower.

We claim:

1. A method of treating an aqueous salt solution in an electrolytic cell, the cell comprising a working chamber and an auxiliary chamber separated from each other by a permeable membrane, one chamber including an anode and the other a cathode, wherein:

i) an aqueous salt solution is supplied to the working chamber at higher than atmospheric pressure;

ii) the solution is filtered under pressure through the permeable membrane into the auxiliary chamber;

iii) an electric current is applied between the cathode and the anode through the aqueous salt solution and the permeable membrane so as to cause electrolysis of the aqueous salt solution; and iv) the solution is substantially all output from the auxiliary chamber.

2. A method according to claim 1, wherein the working chamber includes the anode and the auxiliary chamber includes the cathode.

3. A method according to claims 1 or 2, wherein the aqueous salt solution is made up from water and at least one salt selected from the group comprising:

sodium chloride, potassium chloride and lithium chloride.

4. A method according to claim 1 or 2, wherein the concentration of salt in the aqueous salt solution is from 5 to 35% by weight.

5. A method according to claim 1 or 2, wherein the concentration of salt in the aqueous salt solution is in the range 50 to 350 gdm$^{-3}$.

6. A method according to claim 1 or 2, wherein the aqueous salt solution is a saturated solution.

7. A method according to claim 1 or 2, wherein the aqueous salt solution is supplied at a pressure such that there is a pressure drop of 0.2 to 1.5 bar across the permeable membrane.

8. A method according to claim 1 or 2, wherein the electricity supplied to the aqueous salt solution is in the range 30,000 to 1,000,000 Cdm$^{-3}$.

9. A method according to claim 2, wherein gases evolved at the anode in the working chamber are taken from the working chamber and dissolved in a supply of water so as to generate a solution with oxidizing characteristics.

10. A method according to claim 9, wherein the water supply and/or the solution with oxidising characteristics is mixed in a predetermined ratio with the solution passed out of the auxiliary chamber so as to form a sterilising solution.

11. A method according to claims 1, 2, 9 or 10, wherein the electric current causes the temperature of the solution in the cell to rise by at least 10° C. above the temperature of the solution initially supplied to the cell.

12. An apparatus for the electrolytic treatment of an aqueous salt solution, the apparatus comprising an electrolytic cell having a working chamber and an auxiliary chamber separated from each other by a permeable membrane, one chamber including an anode and the other a cathode, wherein:

i) the working chamber has an input line for a pressurised supply of aqueous salt solution, an output line for gaseous products of electrolysis, and an output for the aqueous salt solution;

ii) the auxiliary chamber has an input for the aqueous salt solution and an output line or lines for aqueous and gaseous products of electrolysis; and iii) the output for aqueous salt solution from the working chamber and the input for aqueous salt solution to the auxiliary chamber each comprise the permeable membrane.

13. An apparatus as claimed in claim 12, wherein the working chamber includes the anode and the auxiliary chamber includes the cathode.

14. An apparatus as claimed in claims 12 or 13, wherein the permeable membrane is made from a ceramic material.

15. An apparatus as claimed in claims 12 or 13, wherein the permeable membrane is made from zirconium oxide.

16. An apparatus as claimed in any of claims 12 or 13, wherein a gas/liquid separator is connected to an output of the working chamber of the cell.

17. An apparatus as claimed in any of claims 12 or 13, wherein a gas/liquid separator is connected to an output of the auxiliary chamber of the cell.

* * * * *